US012770254B2

(12) United States Patent
Kim et al.

(10) Patent No.: US 12,770,254 B2
(45) Date of Patent: Oct. 20, 2026

(54) METHOD FOR PROVIDING MARGIN LINE INFORMATION ABOUT ORAL CAVITY, AND ELECTRONIC DEVICE FOR PERFORMING SAME

(71) Applicant: MEDIT CORP., Seoul (KR)

(72) Inventors: Dusu Kim, Seoul (KR); Wonhoon Choi, Seoul (KR)

(73) Assignee: MEDIT CORP., Seoul (KR)

( * ) Notice: Subject to any disclaimer, the term of this patent is extended or adjusted under 35 U.S.C. 154(b) by 259 days.

(21) Appl. No.: 18/572,530

(22) PCT Filed: Jun. 22, 2022

(86) PCT No.: PCT/KR2022/008873

§ 371 (c)(1),
(2) Date: Dec. 20, 2023

(87) PCT Pub. No.: WO2022/270903

PCT Pub. Date: Dec. 29, 2022

(65) Prior Publication Data

US 2024/0289955 A1 Aug. 29, 2024

(30) Foreign Application Priority Data

Jun. 24, 2021 (KR) ........................ 10-2021-0082344

(51) Int. Cl.
*G06T 7/00* (2017.01)
*A61C 9/00* (2006.01)
(Continued)

(52) U.S. Cl.
CPC .......... *G06T 7/0012* (2013.01); *A61C 9/0053* (2013.01); *A61C 13/0004* (2013.01); *G06T 17/00* (2013.01); *G06T 2207/30036* (2013.01)

(58) Field of Classification Search
None
See application file for complete search history.

(56) References Cited

U.S. PATENT DOCUMENTS 10,667,887 B2 * 6/2020 Rohaly ................ G06T 19/003
11,751,944 B2 * 9/2023 Lang ........................ A61B 5/05
606/130

(Continued)

FOREIGN PATENT DOCUMENTS

JP 2010-532681 A 10/2010
KR 10-1295610 B1 8/2013

(Continued)

OTHER PUBLICATIONS

Korean Office Action for KR 10-2021-0082344 dated Mar. 15, 2023.

(Continued)

*Primary Examiner* — Anand P Bhatnagar
(74) *Attorney, Agent, or Firm* — Sughrue Mion, PLLC

(57) ABSTRACT

A method of processing a three-dimensional oral cavity model may include: obtaining a first three-dimensional oral cavity model generated by scanning an object; obtaining a margin line of the first three-dimensional oral cavity model; and obtaining a second three-dimensional oral cavity model in which the margin line is represented by changing an attribute of data corresponding to a position of the margin line obtained in the first three-dimensional oral cavity model.

13 Claims, 15 Drawing Sheets

(51) Int. Cl.
*A61C 13/00* (2006.01)
*G06T 17/00* (2006.01)

(56) References Cited

U.S. PATENT DOCUMENTS

| | | | | |
|---|---|---|---|---|
| 11,995,839 | B2 * | 5/2024 | Weiss | G06N 3/08 |
| 12,086,998 | B2 * | 9/2024 | Lang | A61B 90/361 |
| 12,121,319 | B2 * | 10/2024 | Fisker | A61C 19/04 |
| 12,133,710 | B2 * | 11/2024 | Saphier | A61B 5/0062 |
| 12,236,607 | B2 * | 2/2025 | Weiss | G06N 3/0464 |
| 12,453,473 | B2 * | 10/2025 | Saphier | A61B 5/7267 |
| 2010/0281370 | A1 | 11/2010 | Rohaly et al. | |
| 2014/0278279 | A1 | 9/2014 | Azernikov et al. | |
| 2025/0127399 | A1 * | 4/2025 | Saphier | G16H 30/20 |
| 2025/0173879 | A1 * | 5/2025 | Lang | A61B 90/53 |

FOREIGN PATENT DOCUMENTS

| | | | |
|---|---|---|---|
| KR | 10-2017-0103489 | A | 9/2017 |
| KR | 10-1911693 | B1 | 1/2019 |
| KR | 10-2019-0074062 | A | 6/2019 |
| KR | 10-2019-0084344 | A | 7/2019 |
| KR | 10-2095531 | B1 | 3/2020 |
| WO | 2016/142818 | A1 | 9/2016 |

OTHER PUBLICATIONS

Korean Notice of Allowance for KR 10-2021-0082344 dated Sep. 11, 2023.
International Search Report for PCT/KR2022/008873 dated Sep. 30, 2022.

* cited by examiner

METHOD FOR PROVIDING MARGIN LINE INFORMATION ABOUT ORAL CAVITY, AND ELECTRONIC DEVICE FOR PERFORMING SAME

CROSS REFERENCE TO RELATED APPLICATIONS

This application is a National Stage of International Application No. PCT/KR2022/008873 filed Jun. 22, 2022, claiming priority based on Korean Patent Application No. 10-2021-0082344 filed Jun. 24, 2021.

TECHNICAL FIELD

Provided are a method of providing margin line information about the oral cavity and an electronic device for performing the method.

BACKGROUND ART

In the related art, impression taking has been performed using an impression material to obtain an impression of the teeth and gums of a patient, followed by the fabrication of a plaster model and a prosthesis based on the plaster model. The fabrication of prostheses based on plaster models has drawbacks: variations in accuracy depending on the skill of practitioners, and a long time and high costs from the process of taking an impression to the fabrication of a prosthesis.

Recently, there has been consistent development in acquiring oral cavity models using intraoral scanners and fabricating prostheses based on the acquired oral cavity models. Utilizing oral scanners enables the establishment of various dental treatments and treatment plans, and offers advantages such as a decrease in cost and time and a decrease in patient's adverse reaction.

However, exact information about boundary surfaces between teeth and prostheses or outlines of boundary surfaces are necessary for exquisite fabrication of prostheses.

DISCLOSURE

Technical Problem

Embodiments provide a method and device for processing a three-dimensional oral cavity model to more accurately provide margin line information about an object to a producer who designs and fabricates an artificial structure for the object.

Embodiments provide a method and device for processing a three-dimensional oral cavity model including margin line information to easily identify and manage margin lines even in environments in which different programs are used.

Technical Solution

An aspect provides a method of processing a three-dimensional oral cavity model, the method including: obtaining a first three-dimensional oral cavity model generated by scanning an object; obtaining a margin line of the first three-dimensional oral cavity model; and obtaining a second three-dimensional oral cavity model in which the margin line is represented by changing an attribute of data corresponding to a position of the margin line obtained in the first three-dimensional oral cavity model.

Another aspect provides an electronic device including: a processor; and a memory storing instructions executable by the processor, wherein the processor executes the instructions to: obtain a first three-dimensional oral cavity model generated by scanning an object; obtain a margin line of the first three-dimensional oral cavity model; and obtain a second three-dimensional oral cavity model in which the margin line is represented by changing an attribute of data corresponding to a position of the margin line obtained in the first three-dimensional oral cavity model.

Another aspect provides a computer program stored in a medium for performing, in combination with an electronic device, a method of processing a three-dimensional oral cavity model, the method including: obtaining a first three-dimensional oral cavity model generated by scanning an object; obtaining a margin line of the first three-dimensional oral cavity model; and obtaining a second three-dimensional oral cavity model in which the margin line is represented by changing an attribute of data corresponding to a position of the margin line obtained in the first three-dimensional oral cavity model.

Advantageous Effects

According to embodiments, margin line information about an object may be more accurately provided to a producer who designs and fabricates an artificial structure for the object.

According to embodiments, a three-dimensional oral cavity model including margin line information may be generated to easily identify and manage margin lines even in environments in which different programs are used.

DESCRIPTION OF DRAWINGS

The present disclosure may be readily understood by combination of the following detailed description and the accompanying drawings in which reference numerals refer to structural elements.

MODE FOR INVENTION

Figure 1:
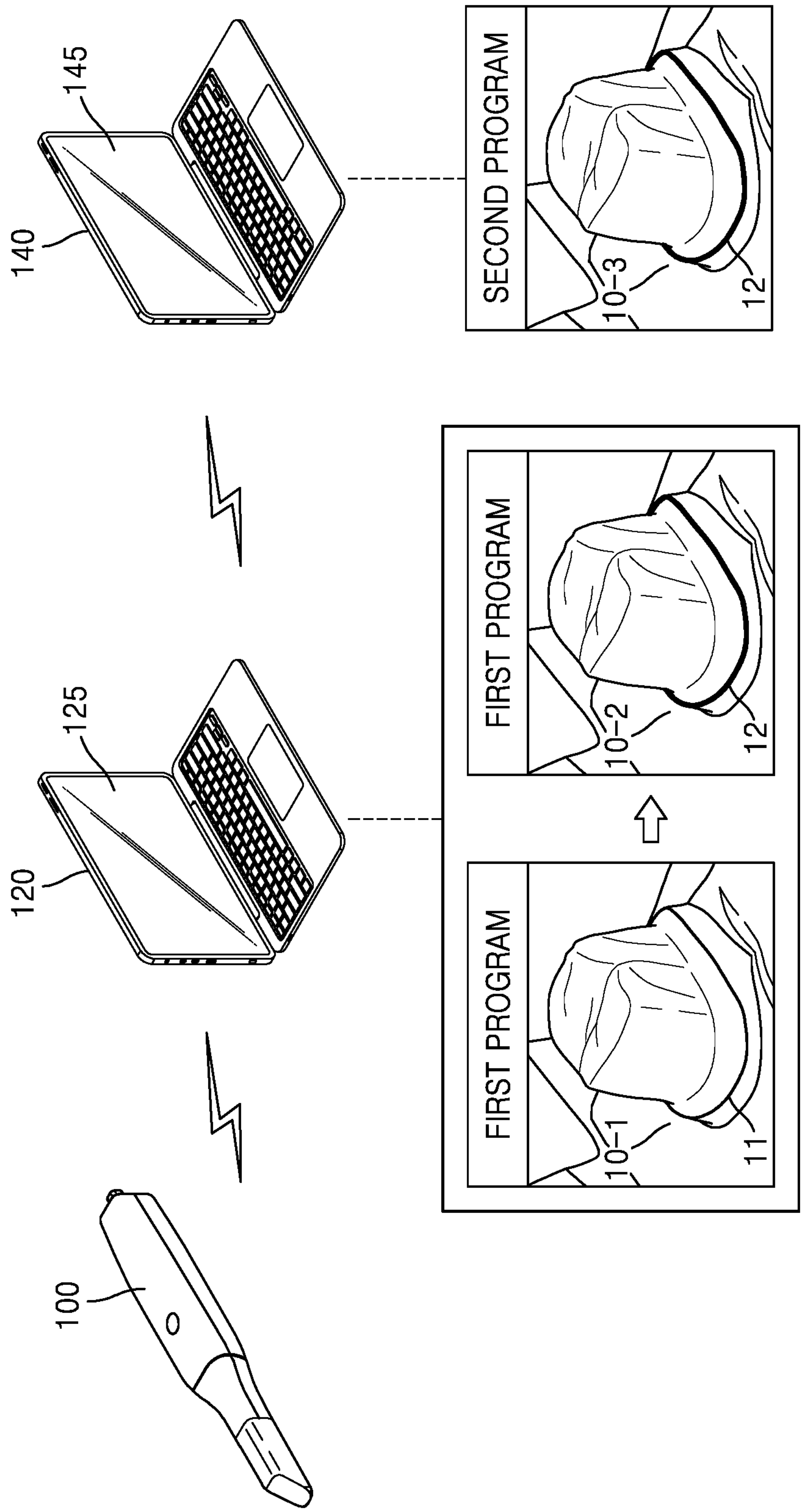
FIG. 1 is a conceptual diagram illustrating a process of providing a three-dimensional oral cavity model from an electronic device to an external device, according to an embodiment.

Various embodiments will now be described in detail with reference to the accompanying drawings. The embodiments described below may be variously modified. To more clearly describe embodiments, those well-known to a person of ordinary skill in the art will not be described in detail.

Furthermore, in the present specification, when an element is referred to as being connected to another element, the element may be directly connected to the other element, or may be connected to the other element with intervening elements being therebetween. It will be further understood that the terms "comprises" and/or "comprising" used herein specify the presence of stated features or elements, but do not preclude the presence or addition of one or more other features or elements.

Furthermore, in the present specification, although terms such as "first" and "second" are used to describe various elements, these elements should not be limited by these terms. These terms are only used to distinguish one element from another element.

Throughout the specification, the term "object" refers to a subject to be photographed and may include a person, an animal, or a part thereof. Examples of the object may include a part (organ or the like) of the body, a phantom, or the like. In addition, examples of the object may include a plaster model that imitates the oral cavity, dentures such as artificial teeth or false teeth, a teeth-shaped dentiform, or the like. Examples of the object may include teeth, gums, at least a portion of the oral cavity, and/or artificial structures insertable into the oral cavity (for example, orthodontic appliances including brackets and wires, implants, abutments, artificial teeth, dental restorations including inlays and onlays, and orthodontic auxiliary tools inserted into the oral cavity), or teeth or gums to which artificial structures are coupled.

A "scanner" may refer to a device for acquiring images related to an object. The scanner may be used to acquire images related to the oral cavity for oral treatment. For example, the scanner may be an intraoral scanner that can be inserted into the oral cavity. Here, in general, the intraoral scanner may be held and carried with one hand and may thus be referred to as a hand-held scanner. In addition, the scanner may be a tabletop scanner that can be used in dental procedures. In addition, the scanner may be used to acquire at least one of a two-dimensional image and a three-dimensional image. In addition, the scanner may be used to acquire at least one two-dimensional image of the oral cavity and generate a three-dimensional image of the oral cavity based on the at least one two-dimensional image. In addition, the scanner may be used to acquire at least one two-dimensional image of the oral cavity and transmit the at least one two-dimensional image to an external device. The external device may generate a three-dimensional image of the oral cavity based on at least one two-dimensional image.

In addition, "scanning the oral cavity" may refer to scanning not only the oral cavity, but also scanning artificial structures and/or other objects representing or related to the oral cavity.

An "Image" may refer to a two-dimensional image of an object, or a three-dimensional model or a three-dimensional image representing an object in three dimensions. For example, an image may be data needed to express or represent an object in two or three dimensions. For example, an image may refer to raw data or a raw image acquired using at least one camera. Specifically, a raw image may be data acquired to create an oral cavity image necessary for diagnosis. Raw images (for example, two-dimensional frame images) may be acquired using at least one camera included in the scanner when scanning an object such as the oral cavity of a patient. In addition, a raw image may refer to an unprocessed original image obtained using the scanner.

A "three-dimensional oral cavity model" may refer to a three-dimensional model of the oral cavity that is created based on raw data acquired through a scanning operation using the scanner. In addition, a "three-dimensional oral cavity model" may refer to a structure that is three-dimensionally modeled based on data obtained by scanning an object such as a tooth, an impression, or an artificial structure using the scanner. A three-dimensional oral cavity model may be created by three-dimensionally modeling the internal structure of the oral cavity and may be referred to as a three-dimensional scan model, a three-dimensional model, or a teeth model. For example, the format of a three-dimensional oral cavity model may be one of standard triangle language (STL), OBJ, and polygon file format (PLY), but is not limited to thereto. In addition, a three-dimensional oral cavity model may include information such as information about the geometry, color, texture, or material of a three-dimensional shape.

In addition, a "polygon" may refer to the smallest unit used to express a three-dimensional shape of a three-dimensional oral cavity model. For example, the surface of a three-dimensional oral cavity model may be expressed using triangular polygons. For example, a polygon may include at least three vertices and one face. The vertices may include information such as position information, color information, or normal line information. A mesh may be an object created by a plurality of polygons gathering in a three-dimensional space. As the number of polygons expressing a three-dimensional oral cavity model of an object increases, the object may be expressed in more detail.

A "margin" may refer to a boundary surface between a first object and a second object. A "margin line" may refer to an outline of the boundary surface between the first object and the second object. A margin line may refer to a line formed by a boundary surface. For example, a margin may refer to a boundary surface between a tooth and an artificial structure (for example, a prosthesis or the like) to be attached to the tooth.

FIG. 1 is a conceptual diagram illustrating a process of providing a three-dimensional oral cavity model from an electronic device to an external device, according to an embodiment.

Referring to FIG. 1, a scanner 100 may be a medical device for acquiring images of the oral cavity. The scanner

100 may be inserted into the oral cavity as shown FIG. 1 and may thus be referred to as an intraoral scanner or a portable scanner. Although the scanner 100 is shown as a hand-held scanner in FIG. 1, the scanner 100 may be a tabletop scanner.

Specifically, the scanner 100 may be a device insertable into the oral cavity to scan an object (for example, an intraoral object such as a tooth, an impression body, or the like) for creating a three-dimensional model of the oral cavity including at least one tooth.

In addition, the scanner 100 may scan the oral cavity of a patient or an impression of the oral cavity of a patient using at least one camera (for example, an optical camera or the like) The scanner 100 may acquire raw data on the surface of an object for imaging the surface of at least one of teeth, gums, artificial structures insertable into the oral cavity, and a plaster model.

The raw data acquired using the scanner 100 may include at least one image acquired using the at least one camera included in the scanner 100. Specifically, the raw data may include at least one two-dimensional frame image obtained through a scanning operation using the scanner 100. Here, the "frame image" may also be referred to as a "frame" or "frame data." The raw data obtained using the scanner 100 may be transmitted to an electronic device 120 connected through a communication network.

Alternatively, the scanner 100 may acquire a three-dimensional model or a three-dimensional image that is generated based on raw data obtained using the at least one camera. In addition, the three-dimensional model or three-dimensional image may be transmitted to the electronic device 120.

The electronic device 120 may be connected to the scanner 100 through the communication network and may receive data obtained through a scanning operation using the scanner 100. The electronic device 120 may be a device capable of generating, processing, displaying, and/or transmitting oral cavity images based on data received from the scanner 100.

Specifically, the electronic device 120 may generate, based on data received from the scanner 100, at least one of information required for oral diagnosis, images illustrating the oral cavity, and models used for oral treatment (for example, a three-dimensional model of a tooth or a three-dimensional model for creating a crown, or the like), and may display generated information and images on a display 125.

In addition, the electronic device 120 may be a computing device such as a smartphone, a laptop computer, a desktop computer, a PDA, or a tablet PC, but is not limited thereto.

In addition, the electronic device 120 may be provided in the form of a server (or a server device) for processing oral cavity images.

In addition, the electronic device 120 may store and execute dedicated software that is linked to the scanner 100. Here, dedicated software may be referred to as a dedicated program or a dedicated application. When the electronic device 120 operates in conjunction with the scanner 100, the dedicated software stored in the electronic device 120 may be connected to the scanner 100 and may receive data acquired by scanning objects in real time. In addition, dedicated software may be provided to each scanner product for processing data. The dedicated software may perform at least one operation to acquire, process, store, and/or transmit a three-dimensional image of an object.

For example, as shown in FIG. 1, the electronic device 120 may execute a first program to generate a first three-dimensional oral cavity model 10-1 of the oral cavity based on raw data received from the scanner 100, and may display the first three-dimensional oral cavity model 10-1 on the display 125. The electronic device 120 may obtain a margin line 11 of a tooth to be treated and may display the margin line 11 on the first three-dimensional oral cavity model 10-1. For example, the first program may be a program for processing a predetermined three-dimensional oral cavity model of the oral cavity.

When the electronic device 120 transmits information on the margin line 11 to an external device 140 and the external device 140 executes a second program that is different from the first program, the external device 140 cannot read information on the margin line 11 because the first and second programs support different data formats. For example, the second program may be a computer aided design (CAD) program for designing artificial structures. The second program may be unable to read the format of information on a three-dimensional oral cavity model generated by the first program. In addition, when the first program converts the format of information on a three-dimensional oral cavity model into a form that is readable by the second program, information on the margin line 11 may be omitted.

That is, the second program may not provide a function of reading a data format corresponding to information on the margin line 11, and thus, the external device 140 may not be able to read information on the margin line 11 and may thus display, in the second program, a three-dimensional oral cavity model in which the margin line 11 is not shown.

The electronic device 120 may express margin lines in a three-dimensional oral cavity model such that the second program can read the margin lines. In this case, even the external device 140 executing the second program different from the first program may easily identify information on the margin lines.

For example, the electronic device 120 may generate a second three-dimensional oral cavity model 10-2 in which margin line information 12 indicating the position of the margin line 11 is represented. Specifically, the electronic device 120 may generate the second three-dimensional oral cavity model 10-2 including the margin line information 12 by changing an attribute of data on a position corresponding to the margin line 11 in the first three-dimensional oral cavity model 10-1. Here, the first three-dimensional oral cavity model 10-1 and the second three-dimensional oral cavity model 10-2 may have the same format, and may be converted to have different formats before being transmitted to the external device 140. The electronic device 120 may display the second three-dimensional oral cavity model 10-2. The electronic device 120 may transmit the second three-dimensional oral cavity model 10-2 to the external device 140. As shown in FIG. 1, the external device 140 may display, on a display 145, a second three-dimensional oral cavity model 10-3 in which the margin line information 12 is expressed.

Figure 2:
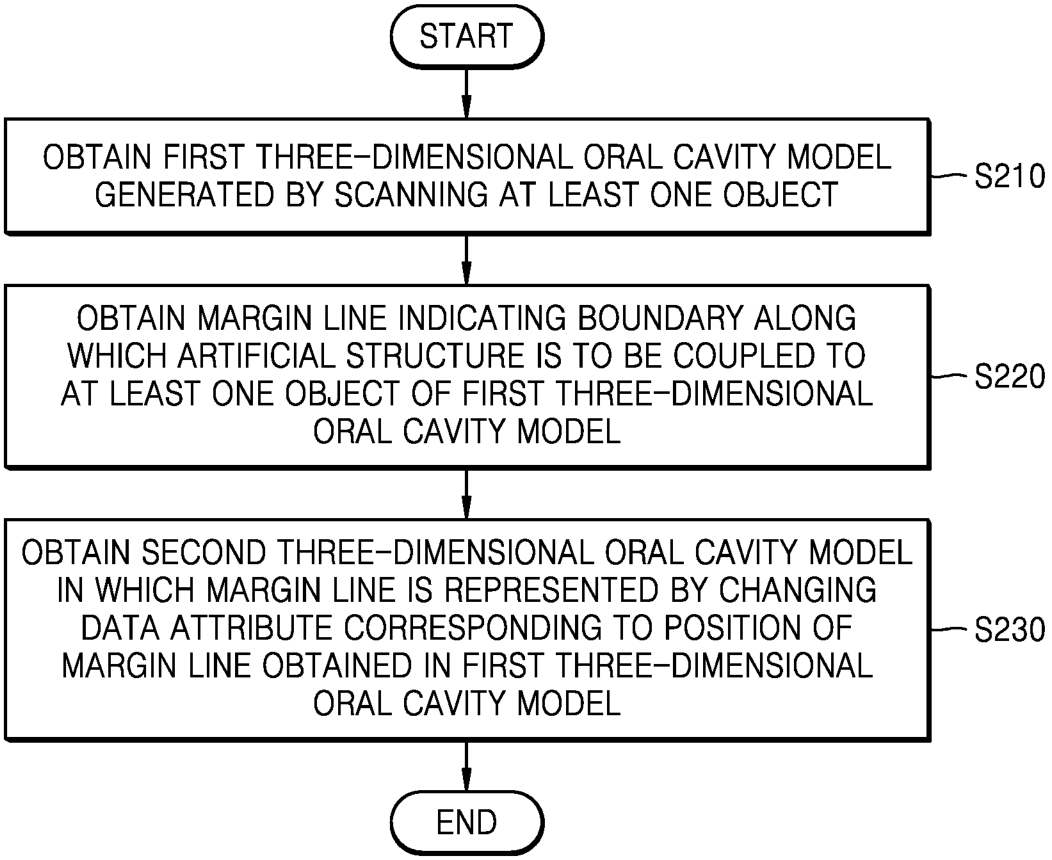
FIG. 2 is a flowchart illustrating a method of operating an electronic device, according to an embodiment.

FIG. 2 is a flowchart illustrating a method of operating an electronic device, according to an embodiment.

Referring to FIG. 2, in operation S210, the electronic device 120 may obtain a first three-dimensional oral cavity model generated by scanning at least one object. For example, the electronic device 120 may receive, from the scanner 100, raw data obtained by scanning the oral cavity including at least one object. The electronic device 120 may obtain the first three-dimensional oral cavity model of the oral cavity based on the raw data.

For example, the first three-dimensional oral cavity model may include a plurality of objects in the oral cavity and information on the three-dimensional shapes of the surfaces of the objects. The electronic device 120 may display the first three-dimensional oral cavity model. For example, the three-dimensional oral cavity model may be expressed using a plurality of polygons. For example, the polygons may have triangular shapes.

In addition, the electronic device 120 may receive the first three-dimensional oral cavity model from the scanner 100, an oral diagnosis device, or a server.

In operation S220, the electronic device 120 may obtain a margin line indicating a boundary at which an artificial structure is to be coupled to at least one object of the first three-dimensional oral cavity model.

For example, the electronic device 120 may display the first three-dimensional oral cavity model on a display. The electronic device 120 may receive an input for selecting a region in the first three-dimensional oral cavity model in which a predetermined margin line is to be created. For example, a user may select a region in the oral cavity of a patient having an object requiring treatment. Here, the user may be a doctor. The electronic device 120 may obtain, based on the selected region, a margin line formed by a boundary surface between the object requiring treatment and the artificial structure to be coupled to the object.

For example, the electronic device 120 may calculate curvature values corresponding to the object within the selected region and may obtain a margin line based on points having curvature values greater than or equal to a preset threshold. In addition, the electronic device 120 may receive an input for selecting a first point having a curvature value equal to or greater than the preset threshold. The electronic device 120 may detect a plurality of points based on the first point and may obtain a margin line formed by the plurality of points.

In operation S230, the electronic device 120 may change an attribute of data corresponding to the position of the margin line obtained in the first three-dimensional oral cavity model to obtain a second three-dimensional oral cavity model in which the margin line is expressed. Here, the attribute of data may be a data color (including saturation, brightness, or the like), and any attribute identifying the margin line may be included in the attribute of data.

For example, the electronic device 120 may change an attribute of data on at least one of vertices, polygons, and vertices of the polygons corresponding to the position of the margin line in the first three-dimensional oral cavity model. For example, the electronic device 120 may change the color of at least one of vertices, polygons, and vertices of the polygons corresponding to the position of the margin line. For example, the vertices corresponding to the position of the margin line may be points at which the margin line and the polygons meet. For example, the vertices of the polygons may be vertices constituting the polygons. For example, the electronic device 120 may change the color of at least one of the vertices, the polygons, and the vertices of the polygons corresponding to the position of the margin line to generate the second three-dimensional oral cavity model in which the margin line is expressed.

For example, the electronic device 120 may change the colors of the vertices of the polygons corresponding to the position of the margin line in the first three-dimensional oral cavity model. In addition, the electronic device 120 may change the colors of the faces of the polygons corresponding to the position of the margin line in the first three-dimensional oral cavity model. For example, the polygons corresponding to the position of the margin line may polygons through which the margin line passes.

In addition, when the colors of the vertices of the polygons through which the margin line passes and/or the colors of the faces of the polygons are changed, the colors of polygons that are adjacent to the margin line and do not meet the margin line may also be changed, and thus, curves may be set based on the margin line to reduce regions that are unnecessarily changed in color. Polygons through which the margin line does not pass may be expressed by gradation. The gradation refers to a technique of changing color tone, lightness, and darkness in stages. When the colors of the vertices of polygons are changed, the colors may be changed based on the distance from the vertices. Accordingly, the margin line may not be clearly shown due to gradated regions, and thus, the electronic device 120 may set curves to reduce the range in which gradation occurs.

For example, the electronic device 120 may set at least one curve based on an obtained margin line to determine the position of the margin line that is to be newly expressed in a three-dimensional oral cavity model. At this time, the at least one curve may be located within a preset range from the margin line. Here, the preset range may be a range of the distance from a reference line. For example, the reference line may be the outline of the margin line. For example, the electronic device 120 may set a first curve within the preset range based on a first outline of the margin line. Likewise, the electronic device 120 may set a second curve within the preset range based on a second outline of the margin line. The electronic device 120 may change the colors of polygons corresponding to the position of the at least one curve. For example, the electronic device 120 may create new vertices at portions in which a plurality of polygons meet the at least one curve in the first three-dimensional oral cavity model, and may assign a color to the new vertices.

For example, the electronic device 120 may set a curve located within a preset range from the margin line. The electronic device 120 may create new vertices at portions in which the curve meets polygons. The electronic device 120 may assign a color to the new vertices. Furthermore, additional curves may be set in addition to the first curve and/or the second curve to precisely provide the position of the margin line. For example, the electronic device 120 may set additional curves outside a curve. For example, the electronic device 120 may set a first additional curve outside the first curve among one or more curves based on the margin line. The electronic device 120 may create additional new vertices at portions in which an additional curve meets polygons. The electronic device 120 may assign a first color to the new vertices and a second color to the additional new vertices.

In addition, the electronic device 120 may transmit the second three-dimensional oral cavity model to the external device 140. For example, the external device 140 may be a device used by a producer who designs and produces an artificial structure for an object. Specifically, the electronic device 120 may transmit, to the external device 140, a file in which the second three-dimensional oral cavity model is stored. When the external device 140 displays the second three-dimensional oral cavity model by reading the file received from the electronic device 120, a producer may easily identify the margin line by using information on the colors of polygons expressed in the second three-dimensional oral cavity model.

In addition, the electronic device 120 may generate margin line information indicating the position of the margin line as a separate sub-three-dimensional oral cavity model. The electronic device 120 may transmit the separate sub-three-dimensional oral cavity model to the external device 140 as a file separate from the first three-dimensional oral cavity model.

Figure 3:
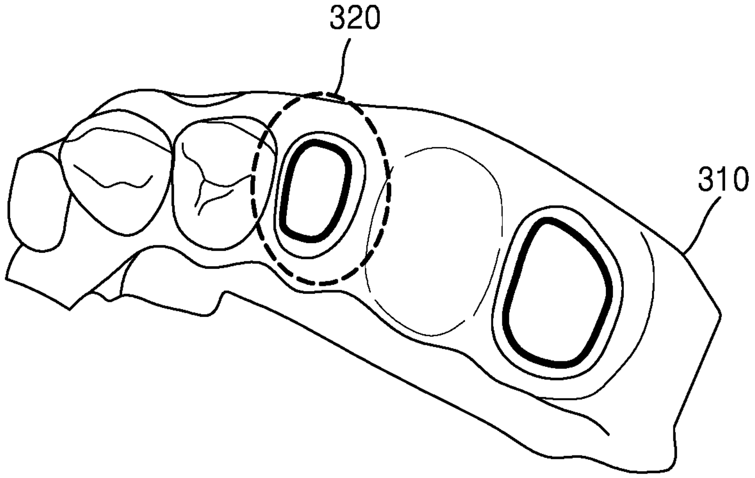
FIG. 3 is a diagram illustrating a three-dimensional oral cavity model according to an embodiment.

FIG. 3 is a diagram illustrating a three-dimensional oral cavity model, according to an embodiment.

The scanner 100 may acquire raw data. The electronic device 120 may receive the raw data from the scanner 100. The electronic device 120 may obtain a three-dimensional oral cavity model of the oral cavity based on the raw data.

Referring to FIG. 3, the electronic device 120 may execute a first program and display a three-dimensional oral cavity model 310 in the first program. For example, the first program may be a program for processing a predetermined three-dimensional oral cavity model. The three-dimensional oral cavity model 310 may three-dimensionally express a plurality of objects in the oral cavity and the surfaces of the objects.

For example, the electronic device 120 may receive an input for selecting a first region 320 that is included in the three-dimensional oral cavity model 310 and contains an object to which an artificial structure is to be coupled. The electronic device 120 may obtain, based on the first region 320, a margin line formed by a boundary surface between the object and the artificial structure. The electronic device 120 may display the three-dimensional oral cavity model 310 in which the margin line is expressed.

Figure 4:
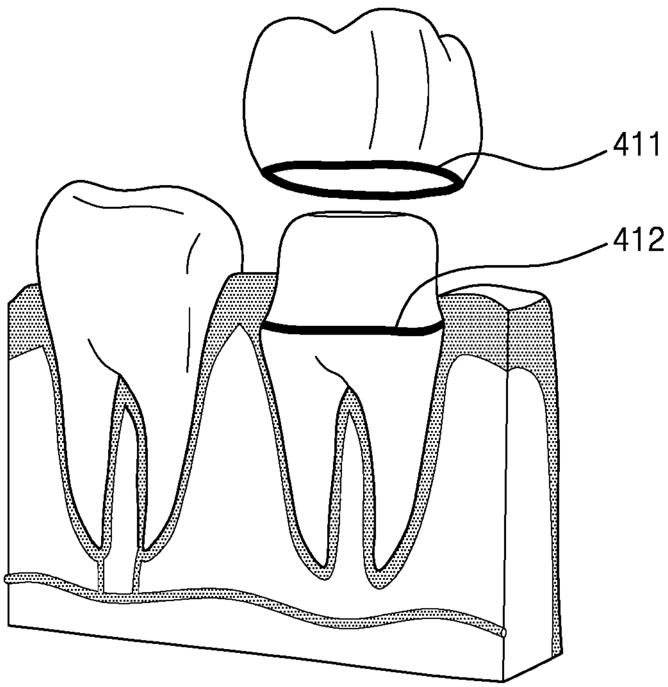
FIG. 4 is a diagram illustrating margin lines according to an embodiment.

FIG. 4 is a diagram illustrating margin lines, according to an embodiment.

Referring to FIG. 4, a margin may refer to a boundary surface between an object (for example, an abutment tooth, a plaster model, a ready-made or customized abutment, or the like) and an artificial structure (for example, a prosthesis or the like) that is to be attached to the object. A margin line may refer to an outline of the boundary surface.

For example, a margin may be present on an artificial structure to be attached to an object, and a margin may also be present on the object. Thus, a margin line 411 may be present on the artificial structure, and a margin line 412 may also be present on the object. Thus, margins and margin lines must be accurately set to increase the accuracy of designing artificial structures that are to be coupled to objects.

Figure 5:
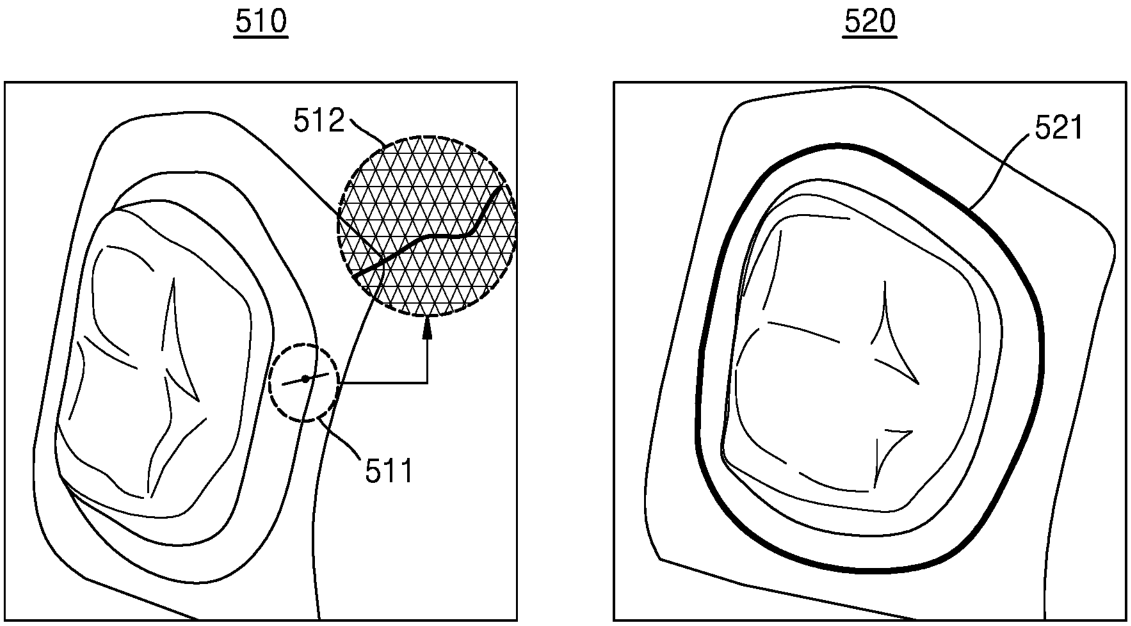
FIG. 5 is a diagram illustrating a process of obtaining a margin line in a three-dimensional oral cavity model, according to an embodiment.

FIG. 5 is a diagram illustrating a process of obtaining a margin line in a three-dimensional oral cavity model, according to an embodiment.

Referring to an image 510 shown in FIG. 5, the electronic device 120 may receive an input for selecting a first point in a region 511 of a three-dimensional oral cavity model. When the region 511 is enlarged and observed as shown in an image 512, the three-dimensional oral cavity model may include a plurality of polygons. For example, the first point may be a point of a polygon that is on an outline of a boundary surface between an object and an artificial structure.

The electronic device 120 may detect, based on the first point, the boundary surface between the object and the artificial structure and may obtain the outline of the boundary surface as a margin line. Referring to an image 520 shown in FIG. 5, the electronic device 120 may display a margin line 521 on the three-dimensional oral cavity model.

Figure 6A:
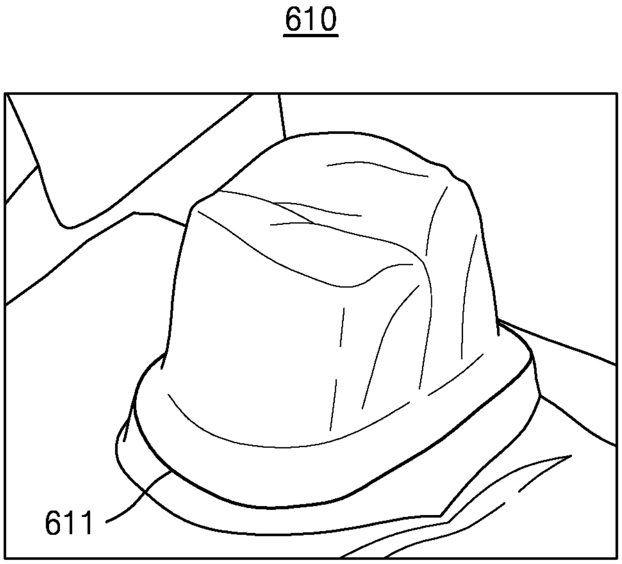
FIG. 6A is a diagram illustrating results of obtaining a margin line in a three-dimensional oral cavity model, according to an embodiment.

FIG. 6A is a diagram illustrating results of obtaining a margin line in a three-dimensional oral cavity model, according to an embodiment.

The electronic device 120 may obtain a three-dimensional oral cavity model of the oral cavity. The electronic device 120 may obtain, as a margin line, an outline of a boundary surface along which an artificial structure is to be coupled to an object requiring treatment. Referring to an image 610 shown in FIG. 6A, the electronic device 120 may display a margin line 611 on the three-dimensional oral cavity model of the object. Here, a first program used to obtain the margin line may be a program that provides functions for generating, processing, displaying, and transmitting an oral image based on data received from the scanner 100. In the first program, margin line information may be separately stored, and the margin line information may be read to display the margin line on the three-dimensional oral cavity model. The electronic device 120 may obtain a margin line by outputting a user interface including a three-dimensional oral cavity model and receiving a user input specifying the margin line through the user interface. Alternatively, the electronic device 120 may automatically recognize and obtain a margin line based on information on the curvature of a three-dimensional oral cavity model.

Furthermore, a second program that is different from the first program may not have a function of reading margin line information, but may have a function of reading three-dimensional oral cavity models. Therefore, even when the second program receives the three-dimensional oral cavity model and the margin line information, the second program may not restore the margin line in the three-dimensional oral cavity model. However, when the three-dimensional oral cavity model includes the margin line information, the second program may display the margin line in the three-dimensional oral cavity model by reading the three-dimensional oral cavity model.

For example, when the format of the first three-dimensional oral cavity model includes color information, the electronic device 120 may generate a second three-dimensional oral cavity model in which the margin line is expressed by changing the colors of polygons corresponding to the position of the margin line.

Figure 6B:
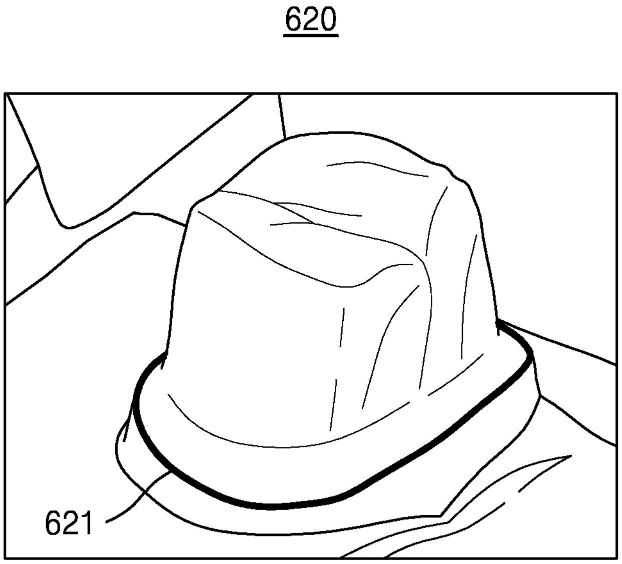
FIGS. 6B and 6C are diagrams illustrating results of changing the color information of polygons corresponding to the position of a margin line in a three-dimensional oral cavity model, according to an embodiment.
Figure 6C:
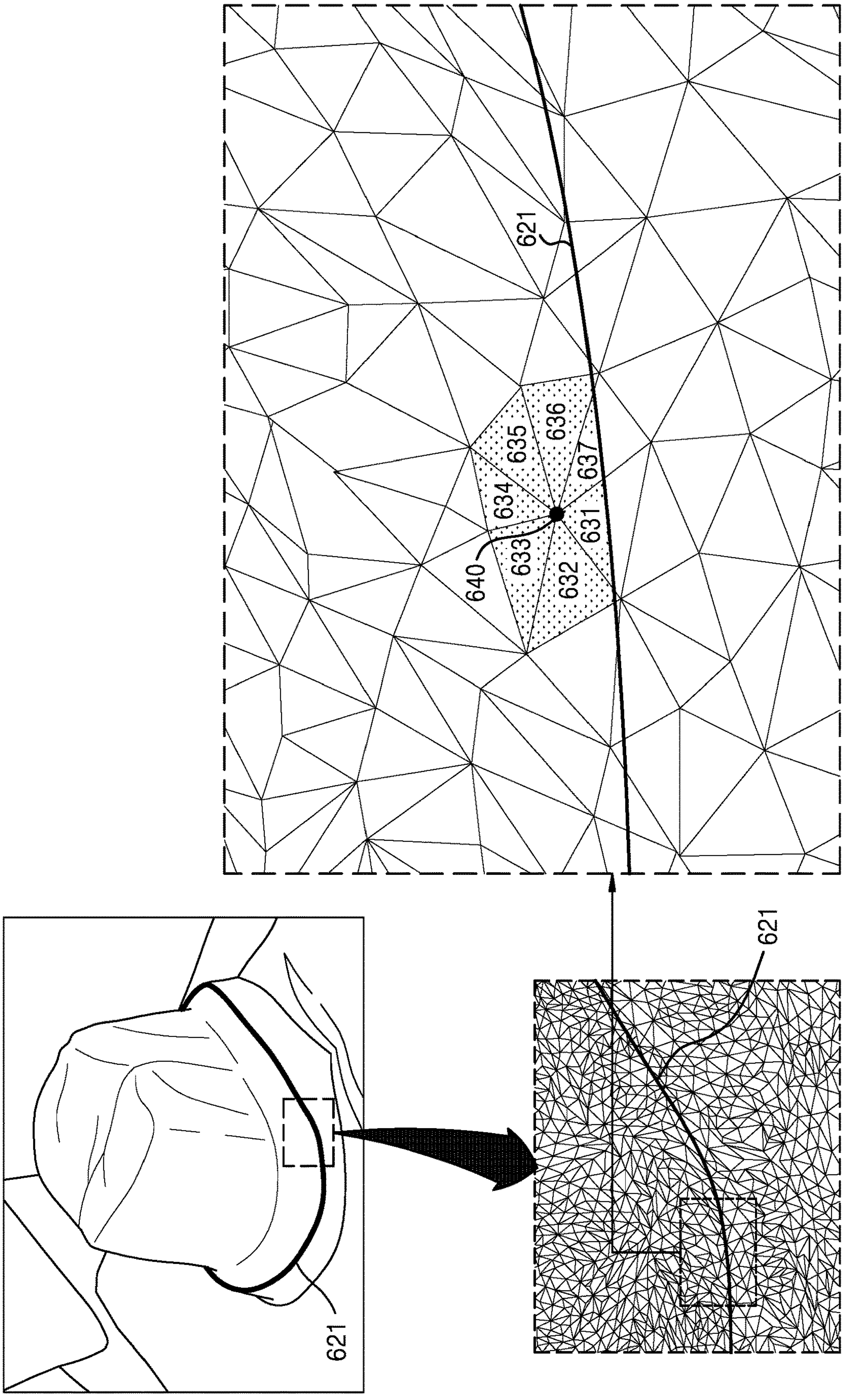

FIGS. 6B and 6C are diagrams illustrating results of changing data attribute information of polygons corresponding to the position of a margin line in a three-dimensional oral cavity model, according to embodiments.

An image 620 shown in FIG. 6B is an image illustrating results of changing a data attribute of polygons corresponding to the position of a margin line 621 in a three-dimensional oral cavity model. Examples of a method of changing a data attribute of polygons may include a method of changing the colors of polygons through which the margin line 621 passes, a method of changing the colors of vertices of polygons that meet the margin line 621, a method of changing the colors of new vertices at portions in which the margin line 621 meets polygons, a method of changing the colors of the faces of polygons through which the margin line 621 passes, and a method of changing the colors of polygons corresponding to the position of at least one curve that is set based on the margin line 621.

For example, the colors of polygons corresponding to the position of a curve may be changed, the colors of new vertices of portions in which a curve meets polygons may be changed, or the colors of additional new vertices of portions in which an additional curve meets polygons may be changed. For example, the additional curve may be a curve set outside of a curve. In this case, a first color may be assigned to the new vertices, and a second color may be assigned to the additional new vertices.

Referring to an image 630 shown in FIG. 6C, the three-dimensional oral cavity model may be expressed using a plurality of polygons. For example, when the color of a vertex 640 of a first polygon 631 through which the margin line 621 passes is changed, the colors of all polygons 631, 632, 633, 634, 635, 636, and 637 that include the vertex 640 may be changed. Therefore, when the color of the vertex 640 of the first polygon 631 is changed as described above, the colors of the faces of second, third, and fourth polygons 633, 634, and 635 that include the vertex 640 of the first polygon 631 but does not meet the margin line 621 may also be changed. In addition, color gradations may be expressed according to the distance from the vertex 640. In addition, the rate of color change may be constant depending on the distance from the vertex 640. In other words, the colors of polygons that are not directly related to the margin line 621 may also be changed. Thus, some regions of the three-dimensional oral cavity model may have unnecessary color bleeding or gradations, and the margin line 621 may be shown unclearly (that is, bumpily or blurredly) in the three-dimensional oral cavity model. Thus, according to embodiments, the electronic device 120 may reduce regions having unnecessary color bleeding or gradations by setting at least one curve based on the margin line 621 and changing the colors of polygons corresponding to the position of the at least one curve.

In addition, the electronic device 120 may perform texture mapping to express a margin line in a three-dimensional oral cavity model. For example, texture mapping may refer to a method of mapping pixels of two-dimensional data to a surface of three-dimensional data.

The electronic device 120 may embed a margin line in three-dimensional scan data by performing texture mapping to adjust variables or color values of two-dimensional data pixels mapped into three-dimensional scan data.

Figure 7:
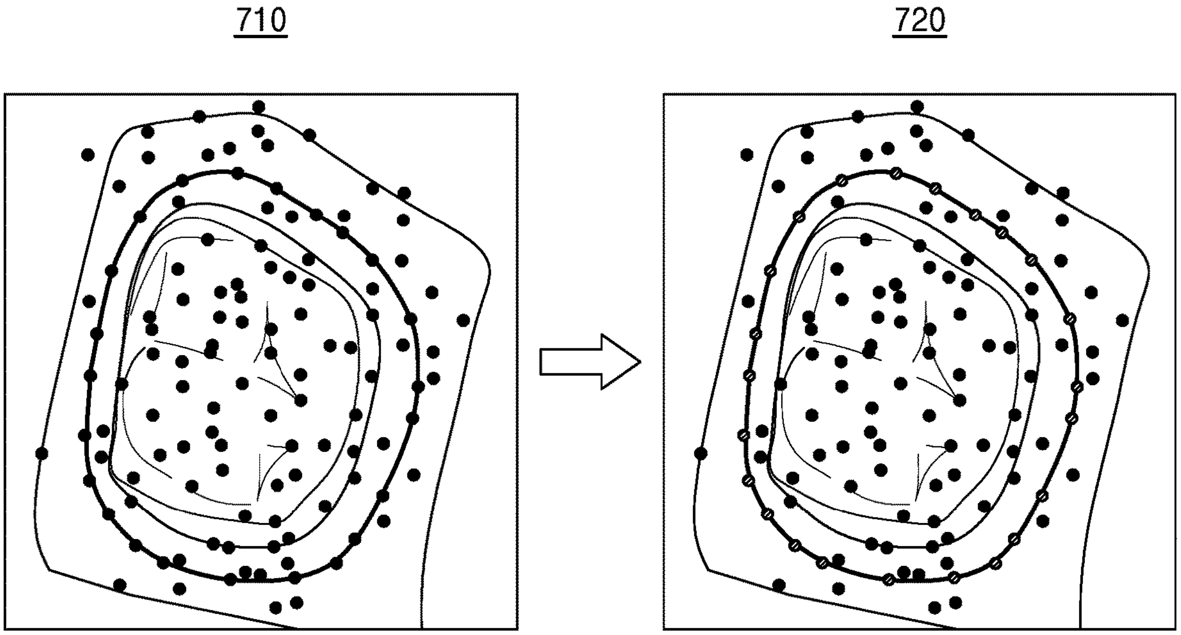
FIG. 7 is a diagram illustrating a process of changing the colors of vertices corresponding to the position of a margin line, according to an embodiment.

FIG. 7 is a diagram illustrating a process of changing the colors of vertices corresponding to the position of a margin line, according to an embodiment.

Referring to an image 710 shown in FIG. 7, the electronic device 120 may display a three-dimensional oral cavity model of an object. A plurality of candidate points used to determine the margin line of the object may be displayed on the three-dimensional oral cavity model. For example, the plurality of candidate points may be points of some polygons forming the three-dimensional oral cavity model.

The electronic device 120 may obtain a margin line formed by a boundary surface between the object and an artificial structure to be coupled to the object, and may display the margin line on the three-dimensional oral cavity model. The electronic device 120 may detect points that are on the margin line among the plurality of candidate points. Referring to an image 720 shown in FIG. 7, the electronic device 120 may change the colors of points that are on the margin line.

Figure 8A:
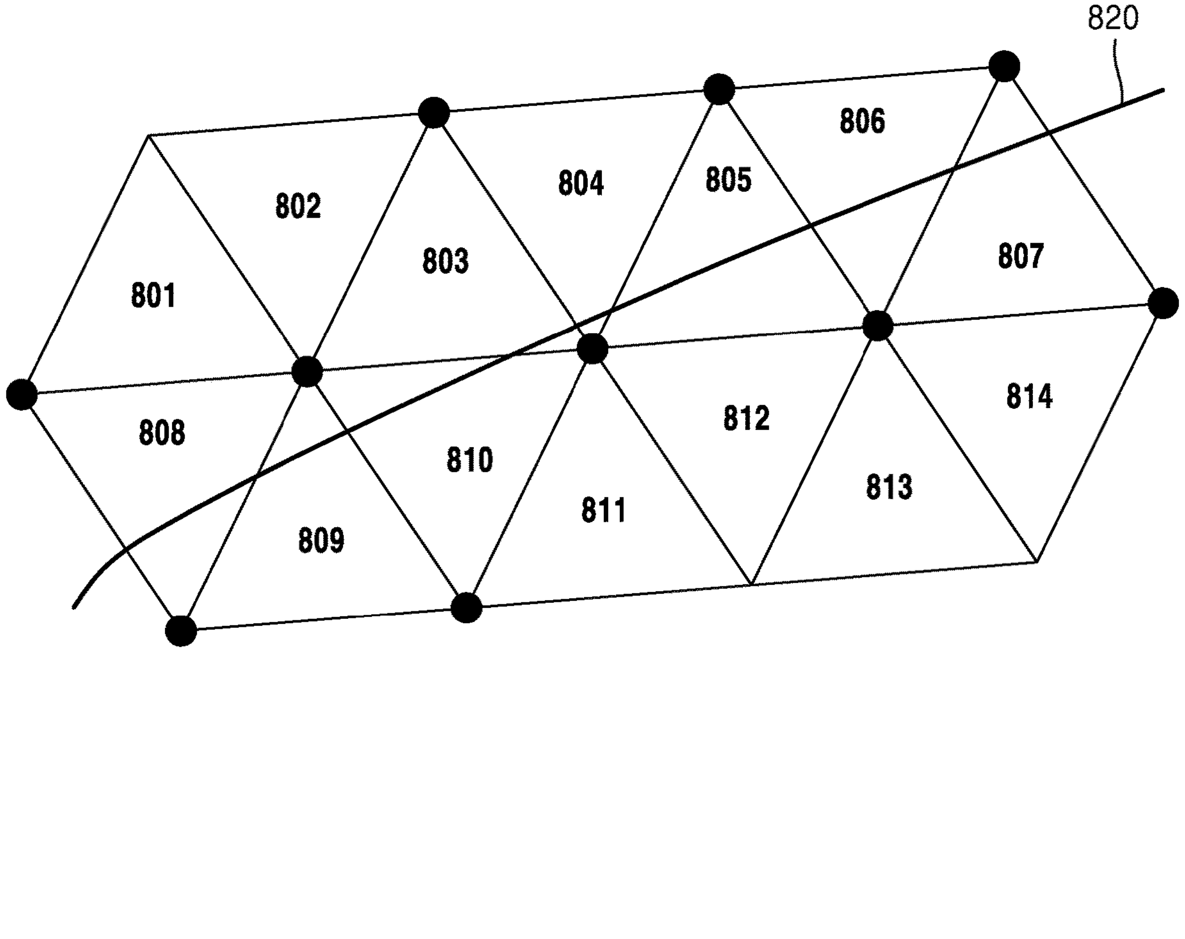
FIG. 8A is a diagram illustrating a partial region in which a margin line is shown on a three-dimensional oral cavity model, according to an embodiment.

FIG. 8A is a diagram illustrating a partial region in which a margin line is shown on a three-dimensional oral cavity model, according to an embodiment.

FIG. 8A is an enlarged view illustrating a partial region of the three-dimensional oral cavity model. The partial region of the three-dimensional oral cavity model may be expressed using a plurality of polygons 801, 802, 803, 804, 805, 806, 807, 808, 809, 810, 811, 812, 813, and 814. For example, the polygons may have a triangular shape with three vertices and may also be referred to as a mesh.

As shown in FIG. 8A, a margin line 820 may be set on the three-dimensional oral cavity model. The margin line 820 may pass through a first group of polygons 803, 804, 805, 806, 807, 808, 809, and 810 in the three-dimensional oral cavity model.

Figure 8B:
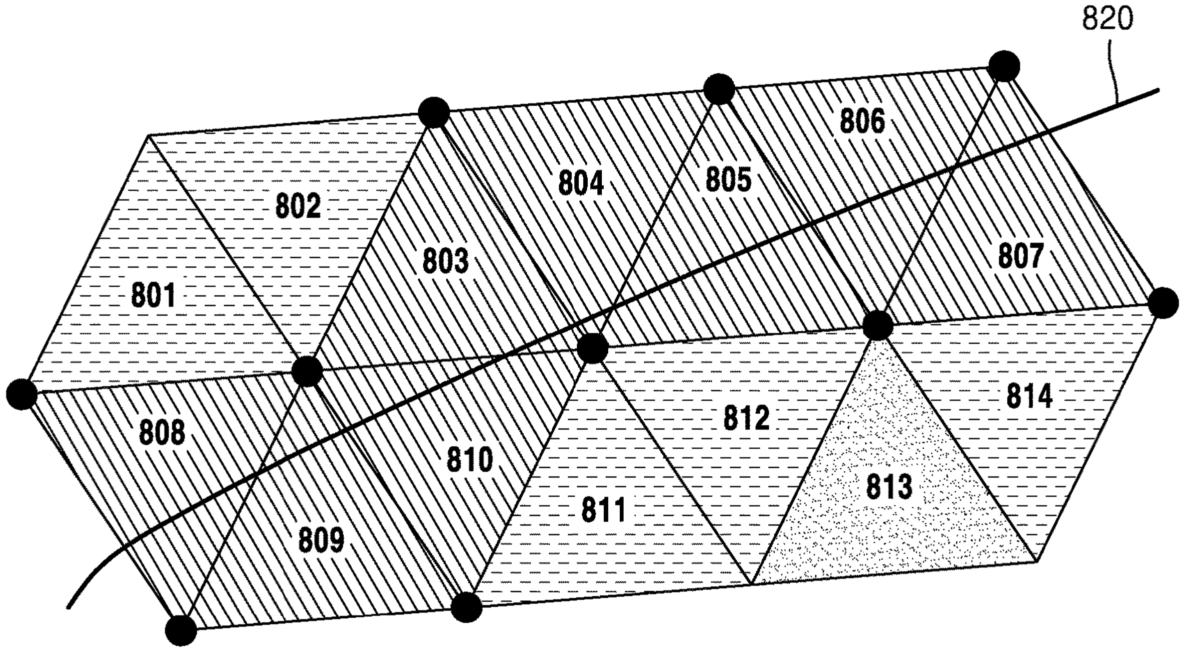
FIG. 8B is a diagram illustrating a process of changing the colors of polygons corresponding to the position of a margin line in a three-dimensional oral cavity model, according to an embodiment.

FIG. 8B is a diagram illustrating a process of changing the colors of polygons corresponding to the position of a margin line on a three-dimensional oral cavity model, according to an embodiment.

For example, the electronic device 120 may detect a first group of polygons 803, 804, 805, 806, 807, 808, 809, and 810 through which a margin line 820 passes in the three-dimensional oral cavity model, and may change the colors of the faces of the first group of polygons 803, 804, 805, 806, 807, 808, 809, and 810. The electronic device 120 may confirm that the margin line 820 is in a mesh region in which the colors of the first group of polygons 803, 804, 805, 806, 807, 808, 809, and 810 have been changed. Therefore, the smaller the areas of polygons, the more accurately information about the margin line 820 may be transmitted.

For example, the electronic device 120 may detect the first group of polygons 803, 804, 805, 806, 807, 808, 809, and 810 through which the margin line 820 passes in the three-dimensional oral cavity model, and may change the colors of the vertices of the first group of polygons 803, 804, 805, 806, 807, 808, 809, and 810. For example, when the colors of first vertices of polygons are changed, the colors of the polygons including the first vertices may be changed. In this case, when the colors of the first vertices are changed from a first color to a second color, vertices relatively close to the first vertices may be expressed with colors relatively similar to the second color, and vertices relative distant from the first vertices may be expressed with colors relatively similar to the colors of other vertices. That is, due to the change of the colors of the first vertices, the colors of the faces of the polygons including the first vertices may be gradated.

In addition, color information of each polygon may be determined depending on the number of vertices changed in color among the vertices of the polygon. The color information of polygons may include information about gradations of the polygons.

Referring to FIG. 8B, the color of each vertex of the first group of polygons 803, 804, 805, 806, 807, 808, 809, and 810 through which the margin line 820 passes in the three-dimensional oral cavity model may be changed. In this case, as the colors of the vertices of the polygon 808 are changed, the colors of polygons 801 and 802 that are adjacent to the polygon 808 but do not meet the margin line 820 may also be changed. That is, because the colors of polygons 801, 802, 811, 812, 813, and 814 through which the margin line 820 does not pass are also changed, a region formed by the polygons 803, 804, 805, 806, 807, 808, 809, and 810 through which the margin line 820 passes may be unclearly displayed.

Polygons may be classified into predetermined groups according to the number of vertices changed in color among the vertices of each polygon. The polygons 801, 802, 803, 804,805, 806, 807, 808, 809, 810, 811, 812, 813, and 814 may be classified into a first group including the polygons 803, 804, 805, 806, 807, 808, 809, and 810 each having three vertices changed in color, a second group including the polygons 801, 802, 811, 812, and 814 each having two vertices changed in color, and a third group including the polygon 813 having one vertex changed in color. Although the margin line 820 does not pass the second group including the polygons 801, 802, 811, 812, and 814 and the third group including the polygon 813, the colors of the polygons 801, 802, 811, 812, 813, and 814 are changed, and thus the position of the first group including the polygons 803, 804, 805, 806, 807, 808, 809, and 810 through which the margin line 820 passes may be unclearly displayed. Therefore, a plurality of curves may be set based on the margin line 820 to reduce the change of the colors of the polygons 801, 802, 811, 812, 813, and 814 through which the margin line 820 does not pass. Effects obtainable by setting a plurality of curves to reduce a range in which unnecessary gradations occur are described with reference to FIGS. 9A and 9B.

Figure 9A:
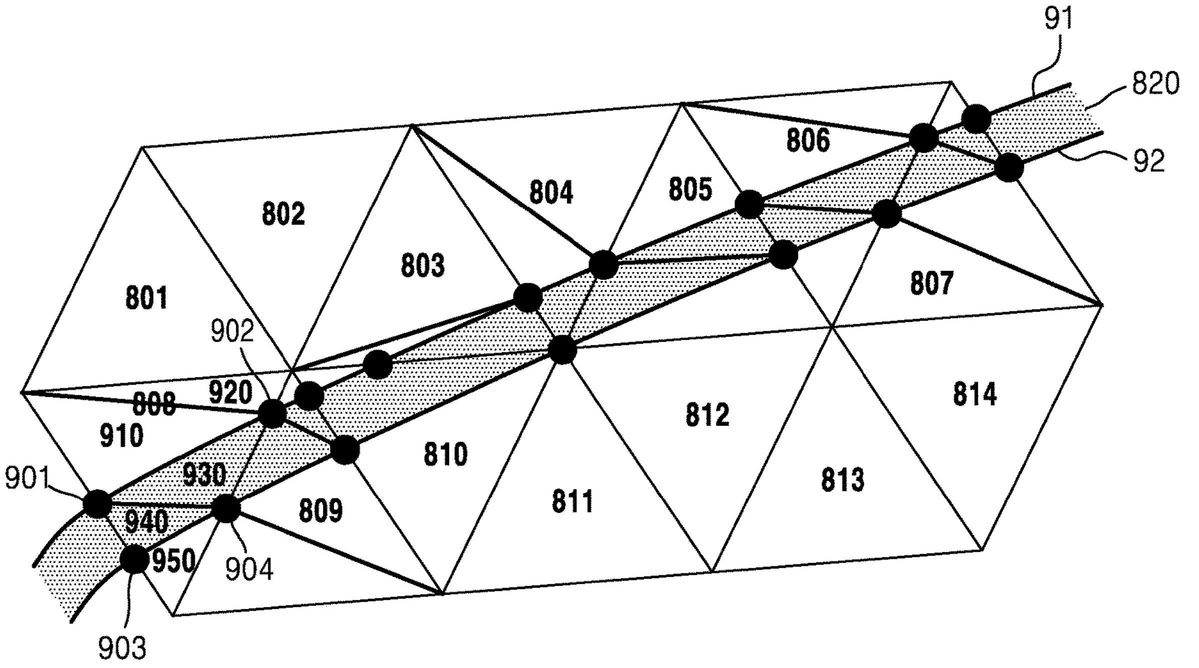
FIG. 9A is a diagram illustrating a process of setting two curves based on a margin line in a three-dimensional oral cavity model, according to an embodiment.

FIG. 9A is a diagram illustrating a process of setting two curves based on a margin line in a three-dimensional oral cavity model, according to an embodiment.

Referring to FIG. 9A, in the three-dimensional oral cavity model, a margin line 820 having a predetermined thickness may be displayed on a three-dimensional oral cavity model. Curves 91 and 92 that are apart from each other within a predetermined distance based on the outline of the margin line 820 may be set on the three-dimensional oral cavity model to preserve the outline of the margin line 820. Because each of the curves 91 and 92 is close to the outline of the margin line 820, the distance between each of the curves 91 and 92 and the outline of the margin line 820 may be difficult to discern with the naked eye.

For example, the curve 91 set on the three-dimensional oral cavity model may divide a first group of polygons 803, 804, 805, 806, 807, 808, 809, and 810. In this case, each of the polygons 803, 804, 805, 806, 807, 808, 809, and 810 included in the first group may obtain a polygon having three vertices based on regions formed by division by the curve 91. Specifically, for example, the polygon 808 may have points 901 and 902 as new vertices at which the curve 91 and the 808 meet each other. Likewise, points 903 and 904 at which the curve 92 and the polygon 808 meet each other may be formed as new vertices. The polygon 808 may be divided, based on the new vertices 901, 902, 903, and 904, into a first sub-polygon 910, a second sub-polygon 920, a third sub-polygon 930, a fourth sub-polygon 940, and a fifth sub-polygon 950.

Figure 9B:
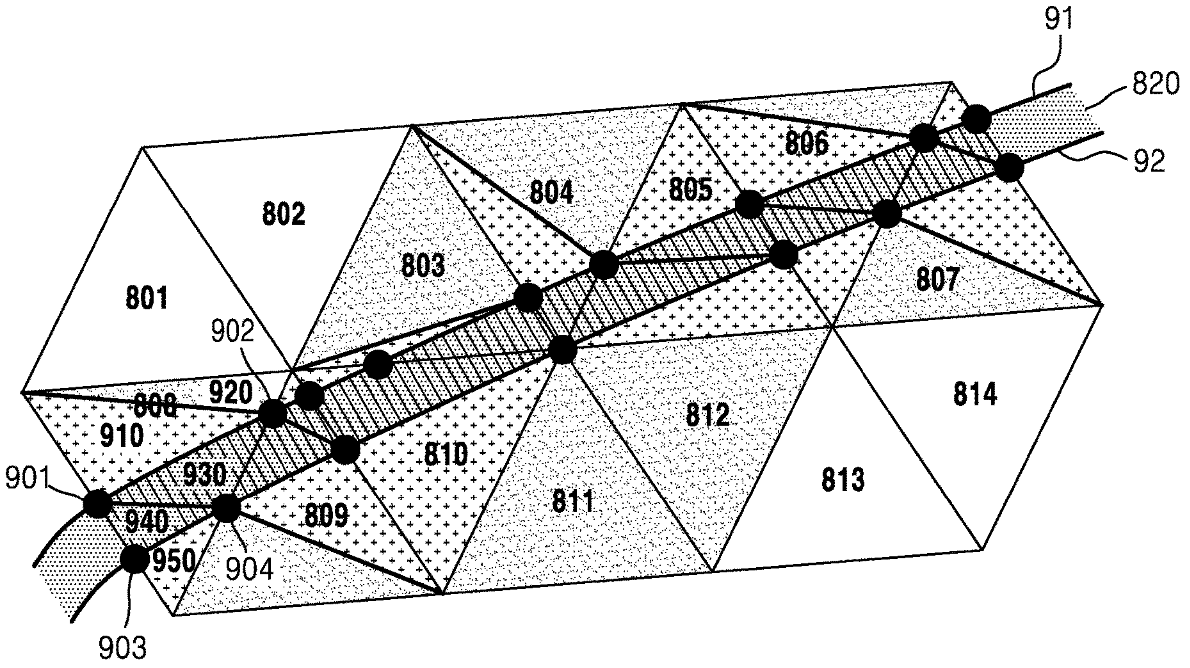
FIG. 9B is a diagram illustrating a process of changing the colors of polygons corresponding to the position of a margin line according to the setting of two curves in a three-dimensional oral cavity model, according to an embodiment.

FIG. 9B is a diagram illustrating a process of changing the colors of polygons corresponding to the position of a margin line according to the settings of two curves in a three-dimensional oral cavity model, according to an embodiment.

For example, the electronic device 120 may detect the polygons through which one or more curves, that is, the curves 91 and 92, pass in the three-dimensional oral cavity model, and may then change the colors of the detected polygons. For example, the electronic device 120 may change the colors of the faces of the detected polygons, change the colors of vertices of the detected polygons, or assign colors to vertices of the detected polygons.

Specifically, a description will now be given by taking the polygon 808 as an example. When colors are assigned to the vertices 901, 902, 903, and 904, the colors of the polygons 801 and 802 may not be changed, and the colors of the sub-polygons 910, 920, 930, 940, and 950 into which the polygon 808 is divided may be changed. When the curves 91 and 92 are not set, the colors of the polygons 801 and 802 adjacent to the polygon 808 are affected. However, when the curves 91 and 92 are set, only the colors of the sub-polygons 910, 920, 930, 940, and 950 may be changed owing to the division of the polygon 808. Therefore, the setting of the curves 91 and 92 may reduce the change of the colors of the second group including the polygons 801, 802, 811, 812, 814 and the third group including the polygon 813 through which the margin line 820 does not pass. Comparing the color changes of the polygons shown in FIG. 8B with the color changes of the polygons shown in 9B, the setting of the curves 91 and 92 may reduce the change of the colors of polygons through which the margin line 820 does not pass, and thus, information on the margin line 820 on the three-dimensional oral cavity model may be accurately provided.

In addition, the electronic device 120 may set a first additional curve (not shown) outside the curve 91 and a second additional curve (not shown) outside the curve 92. The electronic device 120 may obtain new vertices by setting additional curves and may obtain a plurality of polygons by dividing the existing polygons. The electronic device 120 may change the colors of polygons through which additional curves pass, and thus, information about the margin line 820 on the three-dimensional oral cavity model may be more accurately provided than in the case in which additional curved are not set.

Figure 9C:
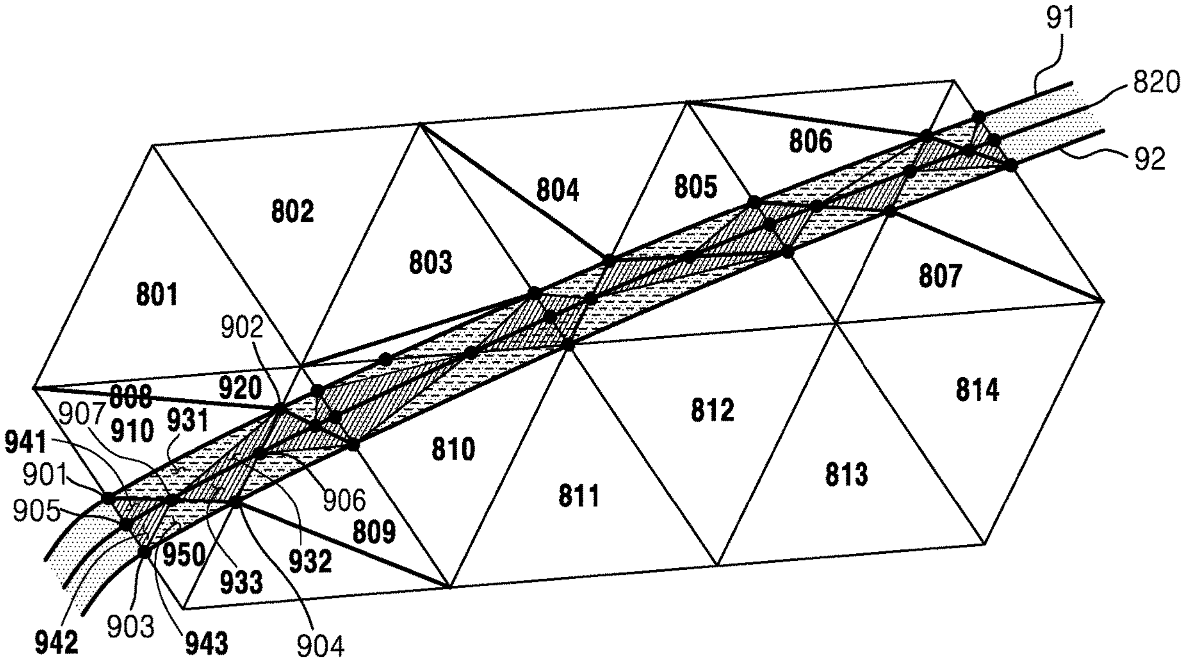
FIG. 9C is a diagram illustrating a process of changing the colors of polygons corresponding to the position of a margin line according to the setting of curves in a three-dimensional oral cavity model, according to another embodiment.

FIG. 9C is a diagram illustrating a process of changing the colors of polygons corresponding to the position of a margin line according to the setting of curves in a three-dimensional oral cavity model, according to another embodiment.

Referring to FIG. 9C, polygons of the three-dimensional oral cavity model may be divided by the margin line 820 and the curves 91 and 92. That is, polygons may be divided by three curves 820, 91, and 92.

For example, the electronic device 120 may assign the color of the margin line to vertices formed along the margin line 820 and may assign the color of an object (for example, a tooth color) to vertices formed along the curves 91 and 92. Because colors are assigned to the vertices, the colors of regions between the curves 91 and 92 in the polygons 803, 804, 805, 806, 807, 808, 809, and 810 of the first group may be changed.

Specifically, a description will now be given by taking the polygon 808 as an example. When the color of the margin line 820 is assigned to vertices 905, 906, and 907 formed along the margin line 820, and an object color is assigned to the vertices 901, 902, 903, and 904 formed along the curves 91 and 92, the colors of the faces of polygons 932, 933, 941, and 942 of a first sub-group and the colors of the faces of polygons 931 and 943 of a second sub-group may be changed. Therefore, the color change of the polygons 801, 802, 811, 812, 813, and 814 through which the margin line 820 does not pass may be minimized, and information about the margin line 820 on the three-dimensional oral cavity model may be accurately provided.

Figure 10:
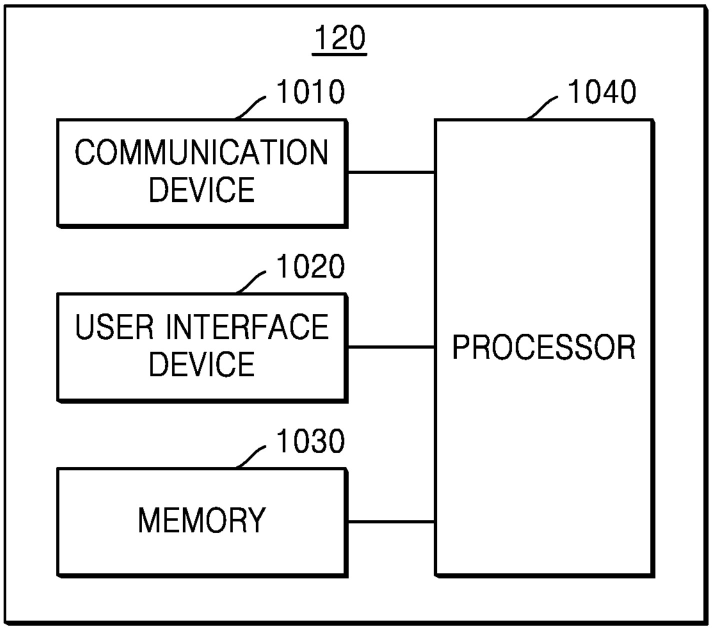
FIG. 10 is a block diagram illustrating a configuration of an electronic device according to an embodiment.

FIG. 10 is a block diagram illustrating a configuration of the electronic device 120 according to an embodiment.

Referring to FIG. 10, the electronic device 120 may include a communication device 1010, a user interface device 1020, a memory 1030, and a processor 1040. However, not all of the illustrated elements are essential elements. The electronic device 120 may be implemented using more elements than the illustrated elements, or may be implemented using fewer elements than the illustrated elements. The elements will now be described.

The communication device 1010 may communicate with the external device 140. Specifically, the communication device 1010 may be connected to a network by wired or wireless communication for communication with the external device 140. Here, the external device 140 may be a server, a smartphone, a tablet, PC, or the like The communication device 1010 may include a communication module that supports one of various wired and wireless communication methods. For example, the communication module may be a chipset or a sticker/barcode (for example, a sticker including an NFC tag) containing information necessary for communication. In addition, the communication module may be a short-distance communication module or a wired communication module.

For example, the communication device 1010 may support at least one of wireless LAN, Wireless Fidelity (Wi-Fi), Wi-Fi Direct (WFD), Bluetooth, Bluetooth Low Energy (BLE), Wired LAN, Near Field Communication (NFC), Zigbee, Infrared Data Association (IrDA), 3G, 4G, and 5G.

The user interface device 1020 may be a device for receiving data from a user to control the electronic device 120.

The processor 1040 may control the user interface device 1020 to generate and output a user interface screen for receiving a command or data from a user. The user interface device 1020 may include an input device for receiving inputs such as an input for controlling the operation of the electronic device 120, and an output device for displaying information such as results of operations of the electronic device 120 or the status of the electronic device 120. For example, the input device may include a mouse, a joystick, an operation panel, or a touch-sensitive panel that is configured to receive user input, and the output device may include a display panel configured to display a screen.

Specifically, the input device may include devices capable of receiving various types of user inputs, such as a keyboard, physical buttons, a mouse, a joystick, a touch screen, a camera, or a microphone. In addition, the output device may include, for example, a display panel or a speaker. However, the user interface device 1020 is not limited thereto and may include devices supporting various inputs and outputs.

According to an embodiment, the user interface device 1020 may display a three-dimensional oral cavity model using the output device, and may receive, through the input device, a user input specifying a margin line on the three-dimensional oral cavity model displayed using the output device.

The memory 1030 may store software or programs. The memory 1030 may store at least one instruction for performing a method of obtaining a second three-dimensional oral cavity model having a margin line expressed therein by obtaining, from a three-dimensional oral cavity model of the oral cavity, a margin line indicating a boundary along which an artificial structure is to be coupled to an object, and changing an attribute of data corresponding to the position of a margin line in a first three-dimensional oral cavity model.

The processor 1040 may control the overall operation of the electronic device 120 and may include at least one processor such as a CPU. The processor 1040 may include one or more processors each specialized for a particular function, or may include an integrated processor.

The processor 1040 may execute a program stored in the memory 1030, read data or files stored in the memory 1030, or store a new file in the memory 1030. The processor 1040 may execute instructions stored in the memory 1030.

The processor 1040 may obtain a first three-dimensional oral cavity model generated by scanning at least one object. For example, the processor 1040 may control the communication device 1010 to receive raw data obtained by scanning the oral cavity using the scanner 100. The processor 1040 may obtain a three-dimensional oral cavity model of the oral cavity based on the raw data.

For example, the first three-dimensional oral cavity model may include a plurality of objects in the oral cavity and three-dimensional formation information on the surfaces of the objects. The processor 1040 may display a three-dimensional oral cavity model through the user interface device 1020. For example, the three-dimensional oral cavity model may be expressed using a plurality of polygons. For example, the polygons may have a triangular shape.

In addition, the processor 1040 may receive the first three-dimensional oral cavity model from the scanner 100, an oral diagnosis device, or a server through the communication device 1010.

The processor 1040 may obtain a margin line indicating a boundary at which an artificial structure is to be coupled to at least one object of the first three-dimensional oral cavity model.

For example, the processor 1040 may display the first three-dimensional oral cavity model on the display of the electronic device 120 through the user interface device 1020. The user interface device 1020 may receive an input for selecting a first region of the first three-dimensional oral cavity model in which a predetermined margin line is to be created. For example, a user may select a region containing an object requiring treatment from the oral cavity of a patient. Here, the user may be a doctor. The processor 1040 may obtain, based on the region, a margin line formed by a boundary surface between the object requiring treatment and an artificial structure to be coupled to the object.

For example, the processor 1040 may calculate curvature values corresponding to the object in the selected region and may obtain a margin line based on points having curvature values greater than or equal to a preset threshold. In addition, the processor 1040 may receive an input for selecting a first point having a curvature value greater than or equal to the preset threshold. The processor 1040 may detect a plurality of points based on the first point and may obtain a margin line formed by the plurality of points.

The processor 1040 may obtain a second three-dimensional oral cavity model in which the margin line is expressed by changing the attribute of data corresponding to the position of the margin line obtained in the first three-dimensional oral cavity model. For example, the attribute of data may include the color of the data (including saturation, brightness, or the like), or any attribute for identifying the margin line.

For example, the processor 1040 may change the colors of polygons corresponding to the position of the margin line in the first three-dimensional oral cavity model. The processor 1040 may generate a second three-dimensional oral cavity model in which the margin line is expressed by changing the colors of polygons corresponding to the position of the margin line.

The processor 1040 may transmit the second three-dimensional oral cavity model to the external device 140. In this case, the external device 140 may be a device used by a producer who designs and produces an artificial structure for an object. Specifically, the communication device 1010 may transmit, to the external device 140, a file in which the second three-dimensional oral cavity model is stored in a preset format. When the external device 140 displays the second three-dimensional oral cavity model by reading the received filed, a producer may easily identify the margin line indicating a boundary along which an artificial structure is to be coupled to the object by using information on the colors of polygons corresponding to the margin line on the second three-dimensional oral cavity model.

For example, the processor 1040 may change an attribute of at least one piece of data among vertices, polygons, and vertices of the polygons corresponding to the position of the margin line in the three-dimensional oral cavity model. For example, the processor 1040 may change the color of at least one of vertices, polygons, and vertices of the polygons corresponding to the position of the margin line. For example, the vertices corresponding to the position of the margin line may be points at which the margin line meets the polygons. For example, the vertices of the polygons may be vertices constituting the polygons. For example, the processor 1040 may generate a second three-dimensional oral cavity model in which the margin line is expressed by changing the color of at least one of the vertices, the polygons, and the vertices of the polygons corresponding to the position of the margin line.

For example, the processor 1040 may change the colors of the vertices constituting the polygons corresponding to the margin line in the first three-dimensional oral cavity model. In addition, the processor 1040 may change the colors of the faces of the polygons corresponding to the position of the margin line in the first three-dimensional oral cavity model. For example, the polygons corresponding to the position of the margin line may be polygons through which the margin line passes.

In addition, when the colors of the vertices of the polygons and/or the faces of the polygons through which the margin line passes are changed, the colors of polygons that do not meet the margin line and are close to the margin line may also be changed. Thus, the processor 1040 may set curves based on the margin line to reduce a region in which unnecessary color changes occur. In other words, polygons through which the margin line does not pass may be gradated. When the colors of the vertices of polygons are changed, the color change may occur based on the distances from the vertices. Therefore, the margin line may not be clearly displayed due to a region in which gradations occur, and thus, the processor 1040 may set curves to reduce the range in which gradations occur.

For example, the processor 1040 may set one or more curves to determine the position of a margin line to be newly expressed in the three-dimensional oral cavity model based on an obtained margin line. At this time, the one or more curves may be located within a preset range from the margin line. Here, the preset range may be a range of the distance from a reference line. For example, the reference line may be the outline of the margin line. For example, the processor 1040 may set a first curve within the preset range based on a first outline of the margin line. Likewise, the processor 1040 may set a second curve within the preset range based on a second outline of the margin line. For example, the processor 1040 may change the colors of polygons corresponding to the position of the one or more curves. For example, the processor 1040 may create new vertices at which a plurality of polygons meet the one or more curves in a first three-dimensional oral cavity model, and may assign a color to the new vertices.

For example, the processor 1040 may set a curve located within the preset range from the margin line. The processor 1040 may create new vertices at which the curve meets polygons. The processor 1040 may assign a color to the new vertices. In addition, additional curves may be set in addition to the first curve and/or the second curve to precisely provide the position of the margin line. For example, the processor 1040 may set the additional curves outside the curve. For example, the processor 1040 may set, based on the margin line, a first additional curve outside the first curve among the one or more curves. The processor 1040 may create additional new vertices at which the additional curves meet polygons. The processor 1040 may assign a first color to the new vertices and a second color to the additional new vertex.

In addition, the processor 1040 may transmit the second three-dimensional oral cavity model to the external device 140. For example, the external device 140 may be a device used by a producer who designs and produces an artificial structure for an object.

In addition, the processor 1040 may generate a separate sub-three-dimensional oral cavity model using margin line information indicating the position of the margin line. The processor 1040 may transmit the first three-dimensional oral cavity model and the separate sub-three-dimensional oral cavity model to the external device 140 through the communication device 1010.

According to an embodiment of the present disclosure, the method of providing margin line information about the oral cavity may be implemented in the form of program instructions executable using various computer means and may be recorded on a computer-readable medium. In addition, an embodiment of the present disclosure may provide a computer-readable recording medium in which one or more programs including instructions for executing the method of providing margin line information about the oral cavity are recorded.

The computer-readable recording medium may include any one of or a combination of program instructions, data files, data structures, and the like. In addition, the programs recorded in the computer-readable medium may be those designed and configured according to the present disclosure or well known to those of ordinary skill in the computer software industry. Examples of the computer-readable media may include: magnetic media such as hard disks, floppy disks, and magnetic tapes; optical recording media such as CD-ROMs and DVDs; magneto-optical media such as floptical disks; and hardware such as ROMs, RAMs, and flash memories specifically configured to store program instructions and execute the program instructions. Examples of the programs may include machine codes made by compilers and high-level language codes executable on computers using interpreters.

The computer-readable recording medium may be provided in the form of a non-transitory storage medium. Wherein, the term "non-transitory" simply means that the storage medium is a tangible device, but this term does not differentiate between in which data is semi-permanently stored in the storage medium and in which the data is temporarily stored in the storage medium. For example, the "non-transitory storage medium" may include a buffer in which data is temporarily stored.

According to an embodiment, a method according to various embodiments of the present disclosure may be included and provided in a computer program product. The computer program product may be traded as a product between a seller and a buyer. The computer program product may be distributed in the form of a machine-readable storage medium (for example, compact disc read only memory (CD-ROM)), or be distributed (for example, downloaded or uploaded) online via an application store (for example, PlayStore™), or between two user devices (for example, smart phones) directly. If distributed online, at least part of the computer program product (downloadable app) may be temporarily generated or at least temporarily stored in a storage medium, such as memory of the manufacturer's server, a server of the application store, or a relay server.

Specifically, the method of providing margin line information about the oral cavity according to the embodiments may be implemented as a computer program product including a recording medium in which a program is stored to obtain a first three-dimensional oral cavity model generated by scanning an object, obtain a margin line of the first three-dimensional oral cavity model, and obtain a second three-dimensional oral cavity model in which the margin line is expressed by changing an attribute of data corresponding to the position of the margin line obtained in the three-dimensional oral cavity model.

While embodiments have been described in detail, the scope of the present invention is not limited to the embodiments, and various modifications and improvements may be made by those of ordinary skill in the art using the basic concept of the present invention as defined in the following claims.

The invention claimed is:

1. A method of processing a three-dimensional oral cavity model, the method comprising:

obtaining a first three-dimensional oral cavity model including a mesh of polygons generated by scanning an object;

obtaining a margin line of the first three-dimensional oral cavity model; and obtaining a second three-dimensional oral cavity model in which the margin line is represented by modifying a graphical attribute of vertices or faces of polygons corresponding to a position of the margin line obtained in the first three-dimensional oral cavity model, wherein the modifying represents margin line information as graphical attribute data of vertices or faces of the polygons.

2. The method of claim 1, wherein the obtaining the second three-dimensional oral cavity model comprises modifying the graphical attribute of at least one of:

vertices at which the margin line intersects a polygon; or faces of the polygons intersected by the margin line.

3. The method of claim 1, wherein the modifying the graphical attribute of the vertices or the faces of the polygons comprises one of:

changing colors of vertices of the polygons corresponding to the position of the margin line in the first three-dimensional oral cavity model; and changing colors of faces of the polygons.

4. The method of claim 1, wherein the modifying the graphical attribute of the vertices or the faces of the polygons comprises:

setting a curve within a preset range from the margin line;

creating new vertices at portions in which the curve meets the polygons; and assigning a color to the new vertices.

5. The method of claim 4, further comprising dividing the polygons based on the new vertices.

6. The method of claim 4, further comprising:

setting an additional curve outside the curve;

creating additional new vertices at portions in which the additional curve meets the polygons; and assigning a first color to the new vertices and a second color to the additional new vertices.

7. An electronic device comprising:

a processor; and a memory storing instructions executable by the processor, wherein the processor executes the instructions to:

obtain a first three-dimensional oral cavity model including a mesh of polygons generated by scanning an object;

obtain a margin line of the first three-dimensional oral cavity model; and obtain a second three-dimensional oral cavity model in which the margin line is represented, by modifying a graphical attribute of vertices or faces of polygons corresponding to a position of the margin line obtained in the first three-dimensional oral cavity model, wherein the modifying represents margin line information as graphical attribute data of vertices or faces of the polygons.

8. The electronic device of claim 7, wherein the processor executes the instructions to obtain the second three-dimensional oral cavity model comprises modifying the graphical attribute of at least one of:

vertices at which the margin line intersects a polygon; or faces of the polygons intersected by the margin line.

9. The electronic device of claim 7, wherein the processor executes the instructions to perform one of:

changing colors of vertices of the polygons corresponding to the position of the margin line in the first three-dimensional oral cavity model; and changing colors of faces of the polygons.

10. The electronic device of claim 7, wherein the processor executes the instructions to:

set a curve within a preset range from the margin line;

create new vertices at portions in which the curve meets the polygons corresponding to the position of the margin line; and assign a color to the new vertices.

11. The electronic device of claim 10, wherein the processor executes the instructions to divide the polygons based on the new vertices.

12. The electronic device of claim 10, wherein the processor executes the instructions to:

set an additional curve outside the curve;

create additional new vertices at portions in which the additional curve meets the polygons; and assign a first color to the new vertices and a second color to the additional new vertices.

13. A non-transitory computer-readable storage medium storing a computer program for performing, in combination with an electronic device, a method of processing a three-dimensional oral cavity model, the method comprising:

obtaining a first three-dimensional oral cavity model including a mesh of polygons generated by scanning an object;

obtaining a margin line of the first three-dimensional oral cavity model; and obtaining a second three-dimensional oral cavity model in which the margin line is represented by modifying a graphical attribute of vertices or faces of polygons corresponding to a position of the margin line obtained in the first three-dimensional oral cavity model, wherein the modifying represents margin line information as graphical attribute data of vertices or faces of the polygons.

* * * * *